United States Patent [19]

Esayan et al.

[11] Patent Number: 4,486,383

[45] Date of Patent: Dec. 4, 1984

[54] METHOD AND APPARATUS FOR COOLING THE PRIMARY CIRCUIT OF A PRESSURIZED WATER NUCLEAR REACTOR

[75] Inventors: Mariana Esayan, Courbevoie; Gérard Celerier, Clamart; Nicolas M. Bonhomme, Pontoise, all of France

[73] Assignee: Framatome & Cie., Courbevoie, France

[21] Appl. No.: 323,636

[22] Filed: Nov. 20, 1981

[30] Foreign Application Priority Data

Dec. 31, 1980 [FR] France .................. 80 27859

[51] Int. Cl.³ ........................................ G21C 19/30
[52] U.S. Cl. .................................. 376/299; 376/298
[58] Field of Search ............... 376/298, 299, 211, 316

[56] References Cited

U.S. PATENT DOCUMENTS

| | | | |
|---|---|---|---|
| 4,033,814 | 7/1977 | Bregeon et al. | 376/298 |
| 4,104,119 | 8/1978 | Schilling | 376/282 |
| 4,113,561 | 9/1978 | Fidler et al. | 376/299 |
| 4,123,324 | 10/1978 | Sanada et al. | 376/298 |
| 4,187,146 | 2/1980 | Shen et al. | 376/298 |
| 4,360,496 | 11/1982 | Marker et al. | 376/298 |

FOREIGN PATENT DOCUMENTS 53-1795  1/1978  Japan .................. 376/299

Primary Examiner—Sal Cangialosi
Attorney, Agent, or Firm—Pollock, Vande Sande & Priddy

[57] ABSTRACT

A method of cooling the primary circuit of a pressurized water nuclear reactor in which, after a first stage, during which water is injected into the steam generators and the steam produced is discharged, cooling is continued during a second stage by water-water heat exchange. In this second stage, the water is made to circulate at the secondary side of at least one steam generator (2) in countercurrent to the primary water, over at least part of its path. The secondary water heated by the primary water is cooled outside the containment enclosure (1) of the nuclear reactor in at least one heat exchanger (31) using raw cooling water. The secondary water is recycled in the steam generator (2). The invention is applicable to the effecting an maintaining of cold shutdown of pressurized water nuclear reactors.

6 Claims, 4 Drawing Figures

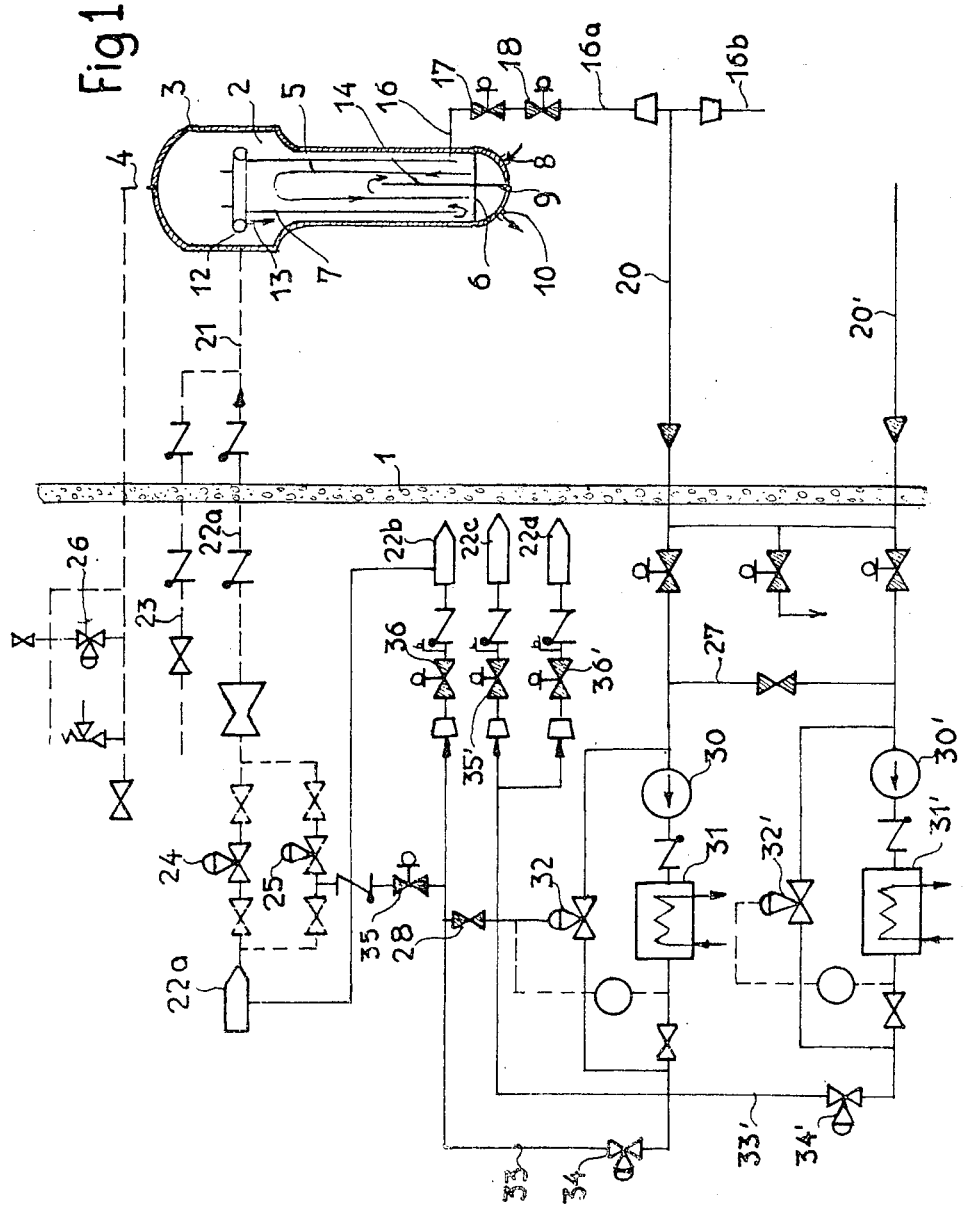

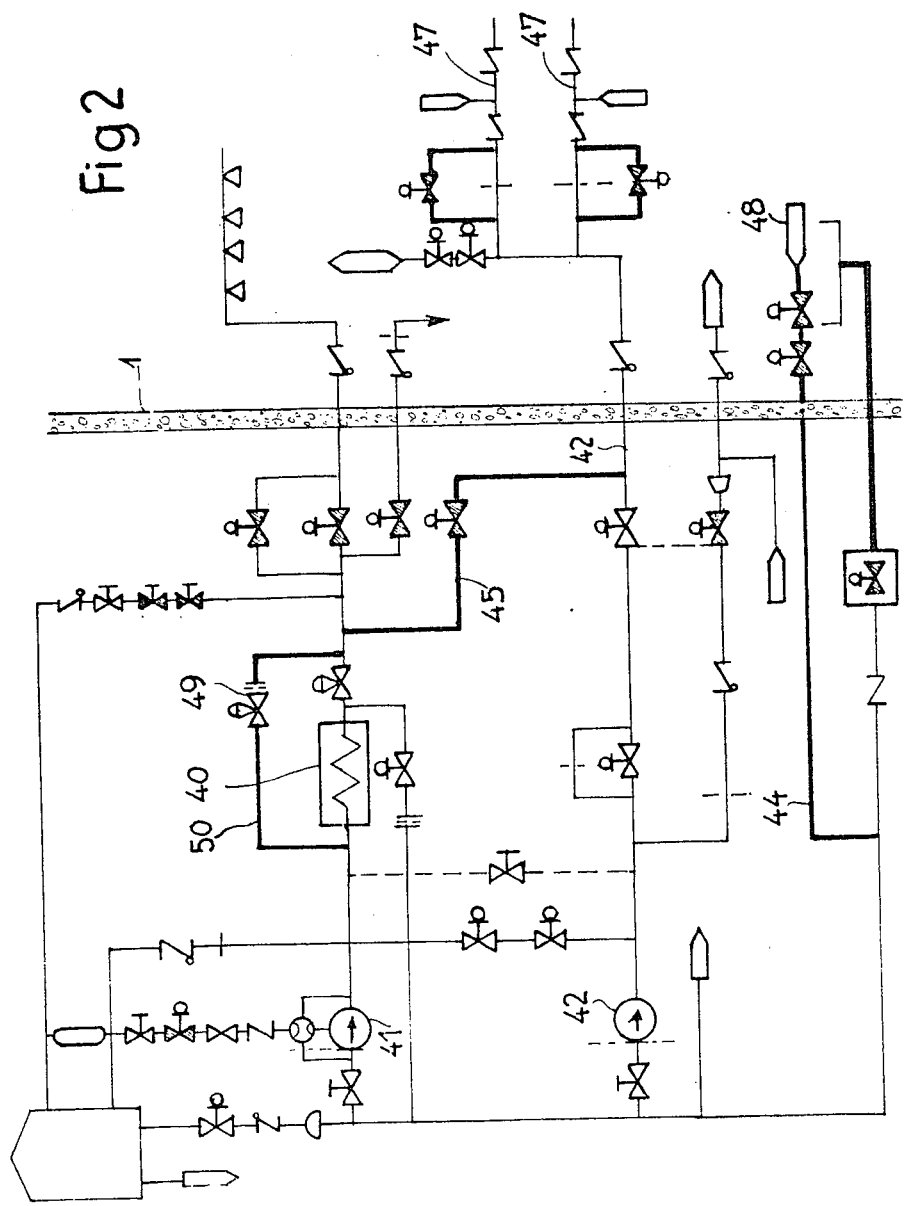

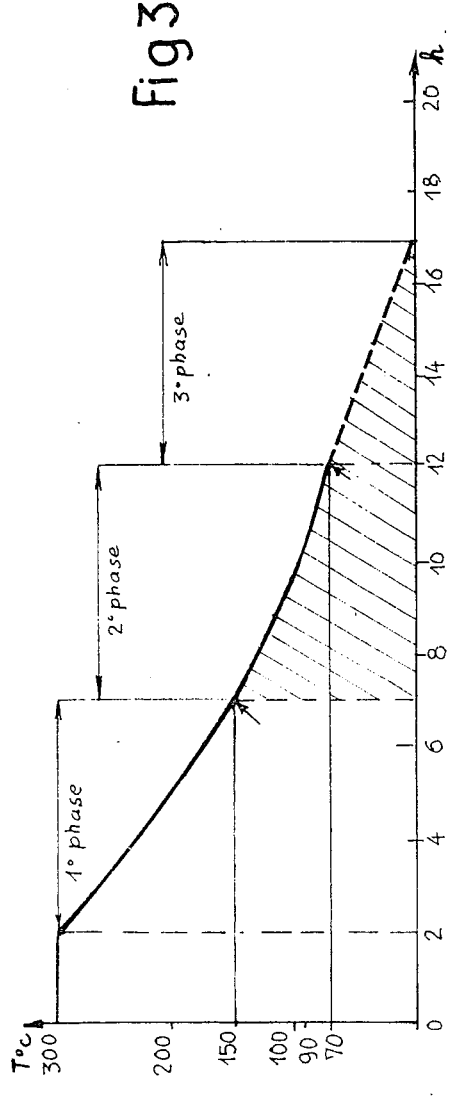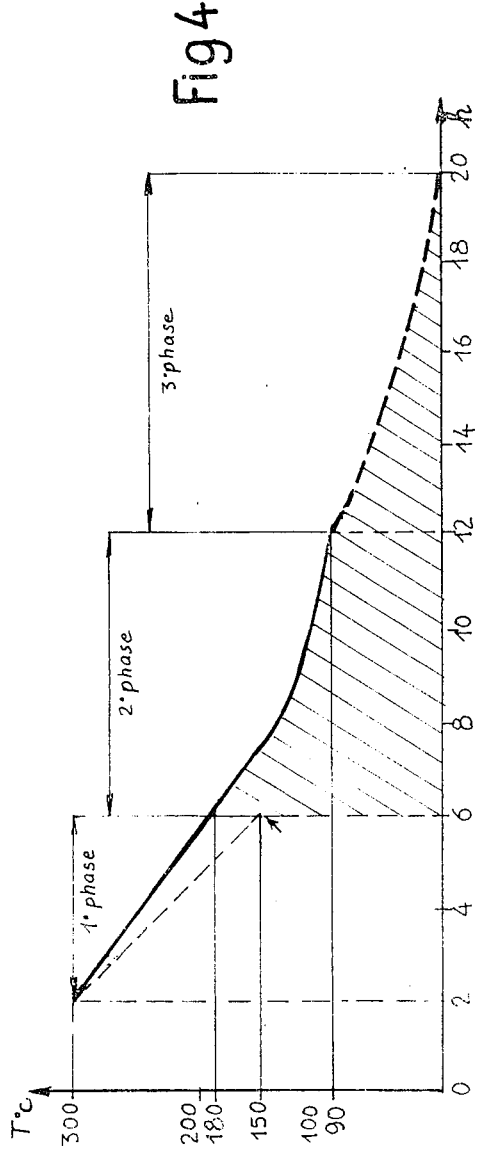

METHOD AND APPARATUS FOR COOLING THE PRIMARY CIRCUIT OF A PRESSURIZED WATER NUCLEAR REACTOR

FIELD OF THE INVENTION

The invention concerns a method for cooling the primary circuit of a pressurized water nuclear reactor, for effecting and maintaining cold shutdown.

BACKGROUND

Inside a protective enclosure which provides containment and isolation of parts of the reactor containing material which is liable to be radio-active to some extent, pressurized water nuclear reactors have a vessel which contains the core of the reactor, a primary circuit in communication with the reactor core, in which pressurized water circulates, and at least two steam generators, each disposed in a loop of the primary circuit.

The enclosure for protection and containment of the reactor is constituted by a very large concrete building which contains in particular the steel vessel of the reactor inside which the fuel assemblies constituting the core of the nuclear reactor are arranged, in which the release of heat is produced during fission of the fuel. The vessel of the nuclear reactor is filled with pressurized water and connected to the primary circuit inside which this water, which is heated by contact with the reactor core, circulates.

The primary circuit is constituted by at least two (but generally three or four) distinct loops in communication with the interior of the reactor vessel. Disposed in each of the loops of the primary circuit, there is a primary pump assuring circulation of the pressurized water and a steam generator assuring the exchange of heat between the primary pressurized water bringing the heat from the core and the feed water the vaporization of which is assured to supply a turbine associated with the reactor.

Pressurized water circulates in the steam generator at its primary side, i.e., inside tubes of small diameter and great length arranged in large numbers inside the casing of the steam generator.

The feed water circulates at the secondary side of the steam generator, i.e., in its casing and outside the small-diameter tubes.

When the nuclear reactor is in operation, the pressurized water is at a temperature close to 300° C. and at a pressure of the order of 155 bars.

However, the nuclear reactor does not operate in an entirely continuous way, and it is sometimes necessary to shut it down, this being done by introducing control rods made of neutron-absorbing material into the reactor core, to maximum insertion position.

The water of the primary circuit is, however, still at a high temperature and at high pressure and, depending on the type of reactor shutdown required, it is necessary to achieve more or less complete cooling and depressurization of the water of the primary circuit of the reactor.

In particular, when shutdown must be effected for maintenance purposes, it is necessary to lower the temperature and pressure of the reactor to a very low level and at any rate to less than 70° C. as regards temperature and less than 38 bars as regards pressure.

In the case of shutdown for the purpose of reloading, it is in fact necessary to lower the pressure to the value of the atmospheric pressure, and the temperature in the final stage must be between 10° and 60° C.

In the case of reloading, it is necessary in fact to open the cover of the reactor vessel so as to have access to the fuel assemblies constituting the core.

These two types of reactor shutdown, with lowering of the temperature and pressure of the primary fluid to a very low level, are termed cold shutdowns of the reactor.

Shutdowns are generally called cold shutdowns when the temperature in the final stage is less than 90° C. and the pressure less than 28 bars.

In all other cases, shutdowns are called intermediate shutdowns or hot shutdowns; these allow the reactor to be rapidly restarted at its nominal operating conditions.

When cooling of the primary fluid is required, during a cold shutdown, the cooling capacity of the steam generators is used in a first stage and these are fed with secondary water by the stand-by feed circuit, the steam produced being directed towards the condenser via the by-pass for the turbine or evacuated into the atmosphere.

The pressurized water circulating in the primary circuit can be cooled in this way to a temperature of close to 180° C.

To continue cooling of the primary fluid, a special cooling circuit termed shutdown cooling circuit (RRA) is used.

This shutdown cooling circuit is connected in parallel with two loops of the primary circuit of the reactor and generally comprises two heat exchangers which effect cooling of the primary circuit water by the cooling water conveyed to these heat exchangers. The shutdown cooling circuit also includes two circulation pumps and a portion of circuit which allows the flow in the heat exchanger to be short-circuited and regulated.

The whole of the assembly constituting the RRA circuit can be incorporated in the reactor containment vessel or conversely can be disposed outside this enclosure.

When the assembly is incorporated in the enclosure, containment of the primary fluid can thus be assured in all types of operation.

This does, however, impose more rigorous conditions as regards maintenance and more exacting conditions as regards the design of the equipment.

When cooling circuit equipment is not incorporated in the containment enclosure, the design and maintenance of installations are simplified but a single containment of the primary fluid, i.e. radiological protection and isolation of possible leakages in all instances, is no longer obtained except by going to the expense of providing another containment holding the equipment not incorporated in the first.

In addition, the primary fluid which circulates in the cooling circuit is at a temperature which at the start is of the order of 180° C. and at a pressure which is always greater than or equal to 28 bars. In practice, to keep the primary pumps operating, it is necessary to have a pressure at least equalling 28 bars, since the primary pumps are only able to operate at a pressure equal to or greater than this limit if the appearance of cavitation phenomena is to be avoided and proper functioning of the seals guaranteed.

In addition, the primary pumps must be kept operating to maintain proper chemical and thermal homogeneity of the primary fluid.

The primary fluid is therefore at a high temperature and pressurized when it flows into the cooling circuit. This makes it essential to provide for adequate safety conditions when designing and protecting the cooling circuit, particularly against internal and external missiles.

In addition, actually cooling the primary fluid with the cooling circuit exchangers creates thermal heterogeneities when a primary pump is no longer available. In this instance in particular, the temperature of the steam generators continues to be high.

SUMMARY OF THE INVENTION

The object of the invention is therefore a method of shutdown cooling for a pressurized water nuclear reactor comprising, inside a containment enclosure, a vessel containing the core of the reactor, a primary circuit with at least two loops in communication with the reactor core, in which pressurized water circulates which comes into contact with the reactor core so as to remove the heat released by this core, and at least two steam generators each disposed in one of the loops of the primary circuit in which the pressurized water circulates at the primary side of the steam generators, while the feed water is introduced at the secondary side of these generators to produce steam, shutdown cooling of the reactor consisting in lowering the temperature and pressure of the water of the primary circuit from their value in the reactor in operation to conditions corresponding to cold shutdown and having a first stage during which feed water is injected into the steam generators and the steam produced is evacuated, this cooling method being required to allow avoiding use of a special circuit in which the primary circuit water is caused to circulate, use of components such as heat exchangers and recirculation pumps disposed inside the containment enclosure, the exit from the containment enclosure of primary water which is hot and pressurized and the appearance of over-pressure in the primary circuit, on restarting of a primary pump, for example.

To this end, in a second stage, with the pressurized water kept circulating in the primary circuit:

the water is made to circulate at the secondary side of the steam generators, in countercurrent to the primary water, over at least one part of its path, the steam generator cooling the primary water by exchange of heat between the primary water and the secondary water, the secondary water is cooled outside the containment enclosure in at least one heat exchanger using raw cooling water, and the cooled secondary water is recycled in the steam generator.

To fully explain the invention, an embodiment of the method according to the invention, in the case of cooling to achieve cold shutdown conditions, in two stages or in three stages, will now be described by way of example, with reference to the attached drawings.

BRIEF DESCRIPTION OF THE DRAWINGS

FIG. 1 represents diagrammatically the cooling circuit using the heat exchangers of a nuclear reactor with four loops.

FIG. 2 represents diagrammatically a complementary cooling circuit of the same reactor, without steam generators.

FIG. 3 is a diagram showing the variations in the temperatures of the primary fluid as a function of time, during cooling of this primary fluid from operating conditions to those of cold shutdown.

FIG. 4 is a diagram showing the variations in the temperature of the primary fluid as a function of time, when a cold shutdown of the nuclear reactor is obtained, with cumulative interruption of the electrical supply of the reactor components and rupturing of a steam pipe.

DETAILED DESCRIPTION

FIG. 1 shows part of the wall 1 of the sealed containment enclosure inside which there are four steam generators and the whole of the primary circuit inside which the pressurized water for cooling the reactor core circulates. A single steam generator 2 has been represented.

This steam generator includes a casing whose large-diameter upper part 3 ends in the steam dome to which the steam outlet pipe 4 is connected.

The lower part of the steam generator, which is smaller in diameter than the upper part, contains the bundle 5 fixed to the tube sheet 6 and constituted by a set of tubes bent into a U communicating with the part of the steam generator under the tube sheet 6. The pressurized water of the primary circuit is brought into this part of the generator through a pipe 8 at one side of the partitioning plate 9, so that the pressurized water circulates inside the tubes of the bundle first vertically upwards in the branches of the tubes of the bundle located in the right part of the generator, as represented in FIG. 1, and then vertically downwards in the second part of the bundle located in the left part of the steam generator in FIG. 1.

The pressurized water then comes back to the second compartment bounded by the partitioning plate 9 to be discharged via the pipe 10 forming part of the primary circuit.

The bundle of tubes 5 is surrounded by a secondary skirt 7 around which, at the top, a feed ring 12 is disposed, which allows the feed water to be brought into the steam generator at 13, so that the feed water circulates first vertically downwards outside the skirt 7 at the base of which openings allow the water to pass into the region occupied by the bundle of tubes 5.

In this region, the two sub-assemblies constituted by the vertical branches of the bundle are separated by a plate 14 which allows a preheating compartment to be constituted, inside the inner space of the skirt 7, in which the feed water is displaced vertically upwards along the tubes of the bundle at the return side of the primary water or cold branch and a second compartment in which the water comes back into contact with the parts of the bundle of tubes constituting the hot branch.

At the base of the secondary skirt 7, at the side of the hot branch of the bundle 5, a pipe 16 opens in which two closure valves 17 and 18 are disposed. When the valves 17 and 18 are open, this pipe 16 allows the feed water constituting the secondary fluid of the steam generator to be drawn in during the second stage of reactor shutdown cooling.

The four steam generators of the nuclear reactor are identical and include the same elements, the pipes 16a and 16b of two of them being connected to a pipe 20 and the pipes 16 of the other two generators to a pipe 20'.

The pipes 20 and 20' pass through the wall 1 of the sealed enclosure and allow the secondary water of the steam generator to leave the containment enclosure in the second stage of the cooling method.

The ring 12 assuring distribution of the feed water in the steam generator is connected to a pipe 21 allowing the feed water to be conveyed from either the normal feed circuit 22 or from the stand-by feed 23.

The normal feed circuit 22 allows the steam generator to be supplied with feed water for producing steam during normal operation of the reactor. This circuit 22 includes in a known way clack valves and flow regulating valves 24 and 25, the valve 25 being placed in parallel with respect to the valve 24. The circuit is also connected to a wholly original circuit for recycling cooled feed water, which will be described hereinafter.

The steam pipe 4 passing through the sealed enclosure 1 is connected to a by-pass circuit 26 allowing the steam to be sent either to the condenser of the turbine or to the atmosphere.

The group consisting of the by-pass circuit 26, the circuits 22 and 23 for feeding the steam generator with secondary water and the circuits for cooling and recycling the feed water which will be described hereinafter are disposed outside the sealed containment enclosure 1.

A single normal feed circuit 22 and a single standby feed circuit 23 have been described, but in fact there are four identical circuits in the circuit 22 and four identical circuits in the circuit 23, each associated with one of the steam generators. The four normal circuits for feeding the four steam generators with water are designated by 22a, 22b, 22c, and 22d.

The pipes 20 and 20', each of which allow the hot secondary water from the two steam generators to be discharged outside the enclosure are each connected to a circuit for cooling this secondary water which also allows it to be returned and recycled in the corresponding steam generators via the normal feed circuits 22.

There will be a description of only one of these two cooling circuits, which are identical and connected together by links 27 and 28 which are normally closed but by opening allow the use, in the event of malfunction in one of the cooling circuits, of the other circuit for cooling the whole of the secondary water coming from the steam generators.

A cooling circuit comprises a pump 30, a heat exchanger 31, a portion of circuit in parallel in which there is a valve 32 and a pipe 33 for recycling the cooled secondary water in which there is a regulating valve 34.

The pipe 33 is connected to one of the feed water circuits 22a via a valve 35 at the parallel branch with the valve 25 in it. The pipe 33 is also connected via a valve 36 to the feed water circuit 22b for feeding the second steam generator.

The second cooling circuit identical to the previous one allows recycling of the feed water in the circuits 22c and 22d.

The operation of the cooling apparatus represented in FIG. 1 will be described hereinafter.

If the nuclear reactor is being shut down with its primary water at over 300° C. and its operating pressure at 155 bars, the first cooling stage consists in introducing feed water into the steam generators via the standby circuits 23 of each of these steam generators and in evacuating the steam produced via the corresponding bypass circuits 26.

Vaporization of the feed water introduced via the ring 12 into the steam generator is produced by heating in contact with the bundle of tubes in which the primary water circulates, set in movement by the primary pump of the corresponding loop.

This first cooling stage which forms part of the known prior art is, however, preferably continued slightly longer to implement the method according to the invention, the final temperature of the water of the primary circuit at the end of this first stage being of the order of 150° C., instead of 180° C. as in the known method.

The pressure of the water of the primary circuit at the end of this stage is 28 bars.

Throughout this first stage, the valves 17 and 18 are closed so that the feed water can only leave the generator vessel in the form of steam via the pipe 4.

At the end of the first stage, the pressurized water is kept circulating in the primary circuit and the valves 17 and 18 are opened so that the path of the feed water represented by arrows in FIG. 1 first descends from the ring 12 to the exterior of the secondary skirt 7 and is then directed upwards along the cold branch of the bundle to the top of the separating plate 14 from where the water descends again along the hot branch of the bundle of tubes to finally leave via the pipe 16, the valves 17 and 18 being open.

It is clear that the feed water circulates in countercurrent to the primary water over a large part of its path inside at least one steam generator. The exchange of heat between the primary water and the secondary water in the steam generator thus allows adequate cooling of the primary water.

The secondary water is conveyed via the pipe 20 out of the enclosure and into the cooling circuit in which the exchanger 31 allows its temperature to be lowered by heat exchange with raw cooling water which can be river water, for example, passed into the tubes of the heat exchanger 31.

The cooled feed water is recycled in the steam generator in which it is used in cooling the primary water again.

The second stage therefore proceeds by continuous circulation of the feed water in each of the steam generators until the primary water reaches the conditions for cold shutdown, i.e., a temperature lower than 90° and a pressure lower than 28 bars.

If cooling of the primary water is to be continued, the steam generators no longer work very satisfactorily as heat exchangers when the temperature of the primary water becomes low, for example less than 70° C. It then becomes necessary to cool the primary water directly in a heat exchanger disposed outside the safety enclosure 1.

This type of cooling is also essential when action is to be taken on the header tanks of steam generators, for maintenance or repair.

FIG. 2 shows a modification of a circuit in pressurized water nuclear reactors allowing cooling to reach cold shutdown, for example when action on a steam generator is necessary, or in the case of shutdown for reloading.

FIG. 2 shows the safety injection and sprinkling circuits of the enclosure of a pressurized water nuclear reactor modified to allow them to effect cooling of the primary water of the reactor after the second cooling stage which has just been described using steam generators as water-water heat exchangers.

The consequences of the disadvantage of techniques according to the prior art are largely eliminated in this stage of cooling according to the invention, since the primary water is at a low temperature and low pressure when the additional cooling is effected outside the vessel.

To effect this complementary cooling, use can be made of exchangers such as 40 and the circulation pumps 41 of the sprinkling circuit for the enclosure and the delivery lines 42 of the safety injection circuit.

The branches of the primary circuit are connected to the suction side of the pumps 41 via conduits such as 44, and the outlet of the exchanger is connected to the cold branches of the primary circuit via a pipe 45 coupling to the delivery side 42 of the safety injection pumps.

There are actually two identical cooling circuits, only one of these circuits having been represented in FIG. 2.

The cold branches of the primary circuit are designated by the reference 47 and the hot branches by the reference 48.

A conduit 50 is provided in which a regulating valve 49 is placed in parallel with respect to the exchanger 40.

Complementary cooling of the water of the primary circuit is obtained by circulation of this primary water under the action of the pumps 41 into the heat exchanger 40, with return of the cooled primary water into the cold branches of the primary circuit.

The primary water can thus be cooled to a temperature of between 10° and 60° C., in a much shorter time than if this cooling were obtained by exchange at the steam generators.

This type of cooling is also useful when action must be taken to maintain or repair a steam generator.

FIG. 3 shows the progress of the temperature of the primary circuit of the reactor as a function of time, during cold shutdown.

Cooling from the operating temperature at hot shutdown of the reactor begins at the time $T=2$ hours by feeding the steam generators with secondary water via the stand-by circuits with evacuation of the steam produced through the by-pass of the turbine. This first cooling stage lasting 5 hours allows the temperature of the primary circuit to be brought to 150° C., which corresponds to the limit that can be achieved using the steam generators with steam production.

The cooling rate throughout this stage is 28° C. per hour.

During the second stage lasting 5 hours, the valves 17 and 18 of the pipes 16 of the steam generators are opened, and these are fed via the feed circuits 22 connected to the cooling circuit, allowing recycling of the feed water.

Throughout this second stage, at least one primary pump operates, the pressure in the primary circuit remaining greater than the minimum pressure to keep these pumps operating at 28 bars. The cooling rate is 10° C. per hour, and at the end of 5 hours, a temperature of 70° C. is reached in the primary circuit.

The secondary water of the steam generators is cooled outside the enclosure. There is no outlet of pressurized water from the primary circuit to cool it outside the enclosure, all cooling being obtained solely by liquid/liquid exchange at the steam generators.

At the end of the second stage, the primary pumps are stopped and cooling is continued in a third stage corresponding to the use of the circuit represented in FIG. 2. Part of the primary water then circulates outside the enclosure for it to be cooled at the exchangers of the sprinkling circuit, until the temperature of the primary water reaches a fixed limit, 60° C., for example, and then assures maintenance of this temperature.

The primary circuit is then entirely depressurized and it is possible to open the vessel, for example for fuel reloading operations.

FIG. 4 shows the progress of the temperature in the primary circuit as a function of time in the case of a cold shutdown accompanied by a loss from the network which no longer assures the electrical supply of the components of the reactor and the cumulative accident of rupturing of the steam pipe of a generator.

The first stage, i.e., cooling by the introduction of water into the steam generators with evacuation of the steam into the atmosphere can proceed to the instant $T=6$ hrs. The temperature of the primary circuit is then 180° C. Cooling is then effected by liquid/liquid exchange at at least one of the steam generators, which corresponds to the second stage.

Throughout this second stage, as the primary pumps are not fed, the water of the primary circuit runs through this by natural circulation.

The second stage is extended to 6 hours ending at a temperature of 90° C., the cooling rate being 10° C./hour.

Third-stage cooling is then carried out by diverting the circulation of the primary water to the sprinkling circuit.

Total cooling lasts approximately 18 hours instead of 15 hours as in the case of the normal cold shutdown described with reference to FIG. 3.

It is clear that the principal advantages of the method according to the invention are that (a) it avoids the outlet of hot pressurized primary water from the primary circuit and the region protected by the containment enclosure (b) it uses a cooling circuit, most of the active and passive elements of which are outside the containment enclosure and (c) it operates with continuous circulation of the primary water either by means of pumps or by thermosiphon, during the second stage, when the primary water is still at a high temperature and a relatively high pressure.

In particular, the design, maintenance and repair of the elements of the cooling circuit located outside the containment enclosure are greatly simplified with regard to solutions where these elements are disposed inside the enclosure.

When there is an incident involving the equipment located inside the enclosure, for example rupturing of the steam pipe, it is impossible to take action rapidly in practice inside the containment enclosure.

It is also possible to position the closure valves 17 and 18 for recirculation of the secondary water outside the enclosure, and in this case all the active elements of the system are outside the containment enclosure and emergency repairs to them are simplified.

In addition, the fluid circulating in the cooling circuit which is identical to the feed water for producing steam in normal operation does not require the same precautions as the primary fluid, so that the use of a stainless steel circuit which would be necessary for the primary fluid is avoided.

When the exchange surface of the blown-off steam generators can no longer be used at the primary side or when cooling of the depressurized primary circuit to ambiant temperature is required, the third cooling stage is used in which the primary water circulates outside the enclosure into one or several heat exchangers. In this case, this primary water is already at a temperature and pressure sufficiently low for this circulation outside the containment enclosure to be trouble-free.

The invention is not limited to the embodiment just described; it includes all the variants thereof.

Cooling can thus be effected by implementing solely the first and second stages or by additionally implementing the third stage.

There can be any number of cooling circuits associated with the steam generators, as a function of the capacity of the heat exchangers used and the required cooling rates of the primary water, but this must be in accordance with the rule of single failure which leads to a minimum of two lines.

The steam generators, in addition to being of the type with a separating plate as described, can also be of a different type capable of assuring countercurrent circulation of the primary water and the secondary water over a large part of the path of the latter.

Cooling of the secondary water in the second stage can be effected by means of any raw water available on the site of the reactor.

Implementation of the cooling method according to the invention is possible whatever the type of cold shutdown to be obtained.

Direct cooling of the primary water outside the enclosure can be effected in any exchangers and cooling circuits, use of the sprinkling and safety injection circuits representing only one embodiment requiring minor modifications of the existing plant of nuclear reactor systems.

Lastly, the method according to the invention is applicable to all pressurized water nuclear reactors, whatever the number of loops in the primary circuit and therefore whatever the number of steam generators.

We claim:

1. Cooling device for effecting and maintaining cold shutdown of a pressurized water nuclear reactor comprising, inside a containment enclosure, a vessel containing the core of said reactor, a primary circuit with at least two loops in communication with said vessel, in which pressurized water or primary water circulates for contacting said core so as to remove heat released therefrom, and at least two steam generators of the preheater type, each disposed in one of said loops and each comprising a casing and a bundle of U-shaped tubes the branches of which are separated by a separating plate disposed within said casing, the primary water circulating in said tubes of said bundle while the feed water is introduced by a feed circuit in said casing and placed in contact with the external surface of said tubes at the outlet end of the primary water and drawn in the form of steam by an outlet at the upper part of said casing, said cooling device comprising
    (a) a pipe for removing the feed water in each said steam generator, said pipe opening inside said casing adjacent said bundle at the inlet end of the primary water in said tubes;
    (b) at least one heat exchanger disposed outside said containment enclosure in a cooling circuit in communication with said pipe and with said feed water circuit;
    (c) at least one valve in said pipe, the opening of said valve, at the end of a first stage of cold shutdown of said reactor during which the feed water is vaporized and the steam is discharged permitting the feed water to be cooled by circulation in said cooling circuit and then recycled in said steam generator by said feed water circuit.

2. Cooling device according to claim 1, wherein said cooling circuit comprises a pump for circulating said feed water.

3. Cooling device according to claim 1, in the case of a nuclear reactor the primary circuit of which comprises four loops, wherein said cooling circuit comprises two cooling circuits, each cooling circuit being associated with two steam generators, said cooling circuits comprising valves for isolating one of said cooling circuits, if necessary, in case of a breakdown.

4. Cooling device according to claim 1, wherein said each pipe comprises at least one closure valve disposed adjacent to and outside the steam generator.

5. Cooling device according to claim 1, wherein each said pipe comprises a closure valve disposed outside said containment enclosure.

6. Cooling device according to claim 1, combined with a supplementary cooling circuit for cooling the primary water outside said containment enclosure.

* * * * *